United States Patent

Horiuchi

(10) Patent No.: US 12,525,860 B2
(45) Date of Patent: Jan. 13, 2026

(54) ROTOR FOR SYNCHRONOUS MOTOR

(71) Applicant: SANYO DENKI CO., LTD., Tokyo (JP)

(72) Inventor: Manabu Horiuchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 203 days.

(21) Appl. No.: 18/450,875

(22) Filed: Aug. 16, 2023

(65) Prior Publication Data

US 2024/0063702 A1 Feb. 22, 2024

(30) Foreign Application Priority Data

Aug. 22, 2022 (JP) ................. 2022-131995

(51) Int. Cl.
*H02K 19/02* (2006.01)
*H02K 1/27* (2022.01)

(52) U.S. Cl.
CPC .............. *H02K 19/02* (2013.01); *H02K 1/27* (2013.01); *H02K 2213/03* (2013.01)

(58) Field of Classification Search
CPC ........ H02K 1/27; H02K 1/2706; H02K 19/00; H02K 19/02; H02K 19/16; H02K 2213/03; H02K 16/02; H02K 21/00; H02K 21/024; H02K 21/025
See application file for complete search history.

(56) References Cited

U.S. PATENT DOCUMENTS

| | | | |
|---|---|---|---|
| 9,083,217 B2 | 7/2015 | Nakada | |
| 2017/0093237 A1 | 3/2017 | Tsuda et al. | |
| 2021/0028661 A1* | 1/2021 | Shih ............... | H02K 1/276 |
| 2022/0344987 A1 | 10/2022 | Tanaka | |

FOREIGN PATENT DOCUMENTS

| | | | | |
|---|---|---|---|---|
| CN | 101588113 A | * | 11/2009 | |
| CN | 102510149 B | | 1/2015 | |
| CN | 106558969 A | * | 4/2017 | ............ B60L 1/003 |
| JP | 2008206308 A | | 9/2008 | |
| JP | 2021-072733 A | | 5/2021 | |

OTHER PUBLICATIONS

Machine Translation of CN_106558969_A (Year: 2017).*
Machine Translation of CN_101588113_A (Year: 2009).*
Extended European Search Report (EESR) issued on Jan. 25, 2024 for European Patent Application No. 23185023.1.

* cited by examiner

*Primary Examiner* — Alexander A Singh
*Assistant Examiner* — Charlie Frank Mann, Jr.
(74) *Attorney, Agent, or Firm* — RANKIN, HILL & CLARK LLP

(57) ABSTRACT

Provided is a rotor of a synchronous motor, including: a plurality of poles; and a plurality of first groove portions located on an outer peripheral portion of the rotor, in which a relationship of $C1=P\times 6N$ is satisfied, where C1 is a number of the plurality of first groove portions, P is a number of pole pairs of the plurality of poles, and N is any natural number.

7 Claims, 18 Drawing Sheets

ROTOR FOR SYNCHRONOUS MOTOR

CROSS-REFERENCE TO RELATED APPLICATION

This application is based on Japanese Patent Application No. 2022-131995 filed with the Japan Patent Office on Aug. 22, 2022, the entire content of which is hereby incorporated by reference.

BACKGROUND

1. Technical Field

The present disclosure relates to a rotor of a synchronous motor.

2. Related Art

The torque ripple of a motor causes various problems including the degradation of control performance and an increase in vibration or noise. Hence, various restraining techniques have been proposed. For example, JP-A-2021-072733 discloses a rotor of a synchronous motor provided with a notch groove on an outer peripheral surface of a rotor core to reduce the torque ripple.

The rotor disclosed in JP-A-2021-072733 decreases the torque ripple by use of the notch groove provided on the outer peripheral surface of the rotor core.

However, the rotor disclosed in JP-A-2021-072733 is subject to some constraints on the configuration of the notch groove. As a result, the notch groove has a complicated shape. When the configuration is applied to a general rotor, it is difficult to realize the above technology while satisfying the conditions, and exert a desired effect.

Furthermore, the rotor disclosed in JP-A-2021-072733 decreases torque ripple in magnetic torque as illustrated in FIG. 7 of JP-A-2021-072733. However, it is not possible to decrease torque ripple in reluctance torque as illustrated in FIG. 6 of JP-A-2021-072733. Therefore, a technology is required which decreases torque ripple in total motor torque being the sum of magnetic torque and reluctance torque.

SUMMARY

A rotor of an embodiment of the present disclosure is a rotor of a synchronous motor, including: a plurality of poles; and a plurality of first groove portions located on an outer peripheral portion of the rotor, in which a relationship of $C1=P\times 6N$ is satisfied, where C1 is a number of the plurality of first groove portions, P is a number of pole pairs of the plurality of poles, and N is any natural number.

DETAILED DESCRIPTION

Figure 1:
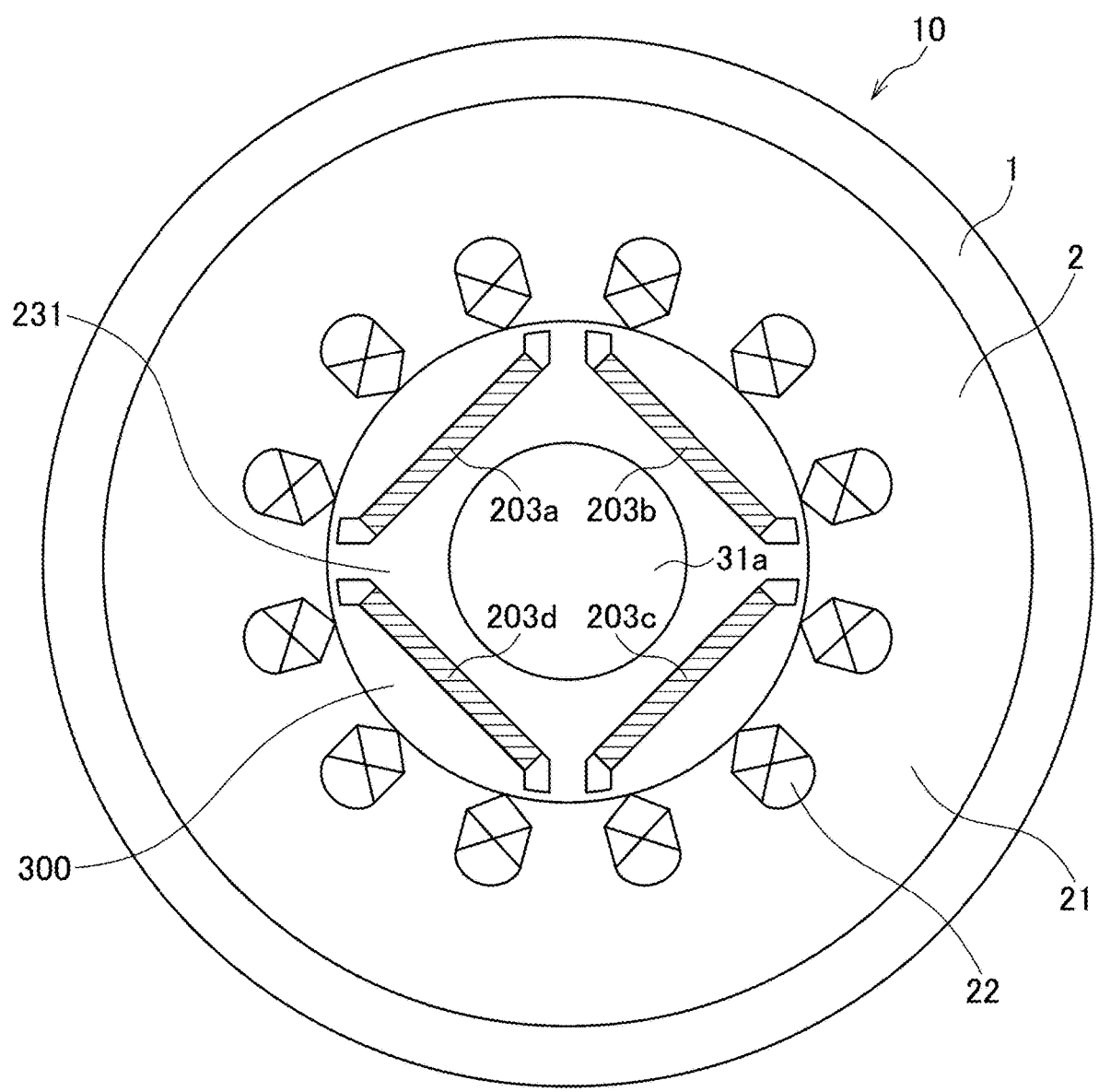
FIG. 1 is a horizontal cross-sectional view of a synchronous motor used in a reference example.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a rotor of a synchronous motor, in which torque ripple is decreased.

A rotor of a synchronous motor according to one aspect of the present disclosure includes: a plurality of poles; and a plurality of first groove portions located on an outer peripheral portion of the rotor, in which a relationship of $C1=P\times 6N$ is satisfied, where C1 is a number of the plurality of first groove portions, P is a number of pole pairs of the plurality of poles, and N is any natural number.

According to the embodiment, the outer peripheral portion of the rotor is provided with 6N (N is any natural number) groove portions per pole pair. In addition, 6N permeance variations are provided. Therefore, the amplitudes of harmonic components are reduced. Accordingly, the torque ripple pulsation can be reduced.

Embodiments of the present disclosure are described hereinafter with reference to the drawings. Note that descriptions of members having the same reference numerals as members that have already been described are omitted in the detailed description for convenience's sake. Moreover, the dimensions of each member illustrated in the drawings may be different from actual dimensions thereof for the convenience of description.

FIG. 1 is a horizontal cross-sectional view of a synchronous motor 10 according to a reference example.

As illustrated in FIG. 1, the synchronous motor 10 includes a stator 2 fixed to a cylindrical housing 1, and a rotor 300 that can rotate relative to the stator 2.

The stator 2 includes a ring-shaped stator core 21 formed of a plurality of electromagnetic steel plates (second core sheets) laminated in a rotation axis direction. The stator core 21 includes a plurality of stator coils 22 on an inner peripheral surface side thereof. The plurality of stator coils 22 is placed in a circular fashion. In such a configuration, alternating current is applied to the plurality of stator coils 22 from the outside.

The rotor 300 includes a rotor core 231 formed of a plurality of electromagnetic steel plates (first core sheets) laminated in the rotation axis direction. The rotor core 231 is formed a cylinder form. A shaft mounting hole 31a is formed in a radially central part of the rotor core 231. An unillustrated drive shaft is fixed in the shaft mounting hole 31a. The drive shaft is rotatably supported by a housing 1.

The rotor 300 includes four rotor magnets 203a to 203d in the rotor core 231. The rotor magnets 203a to 203d are made of a permanent magnet. The rotor magnets 203a to 203d are embedded in a slot, which enables the rotor magnets 203a to 203d to be firmly fixed therein. The each of the rotor magnets 203a to 203d forms one pole having a different polarity.

Figure 2:
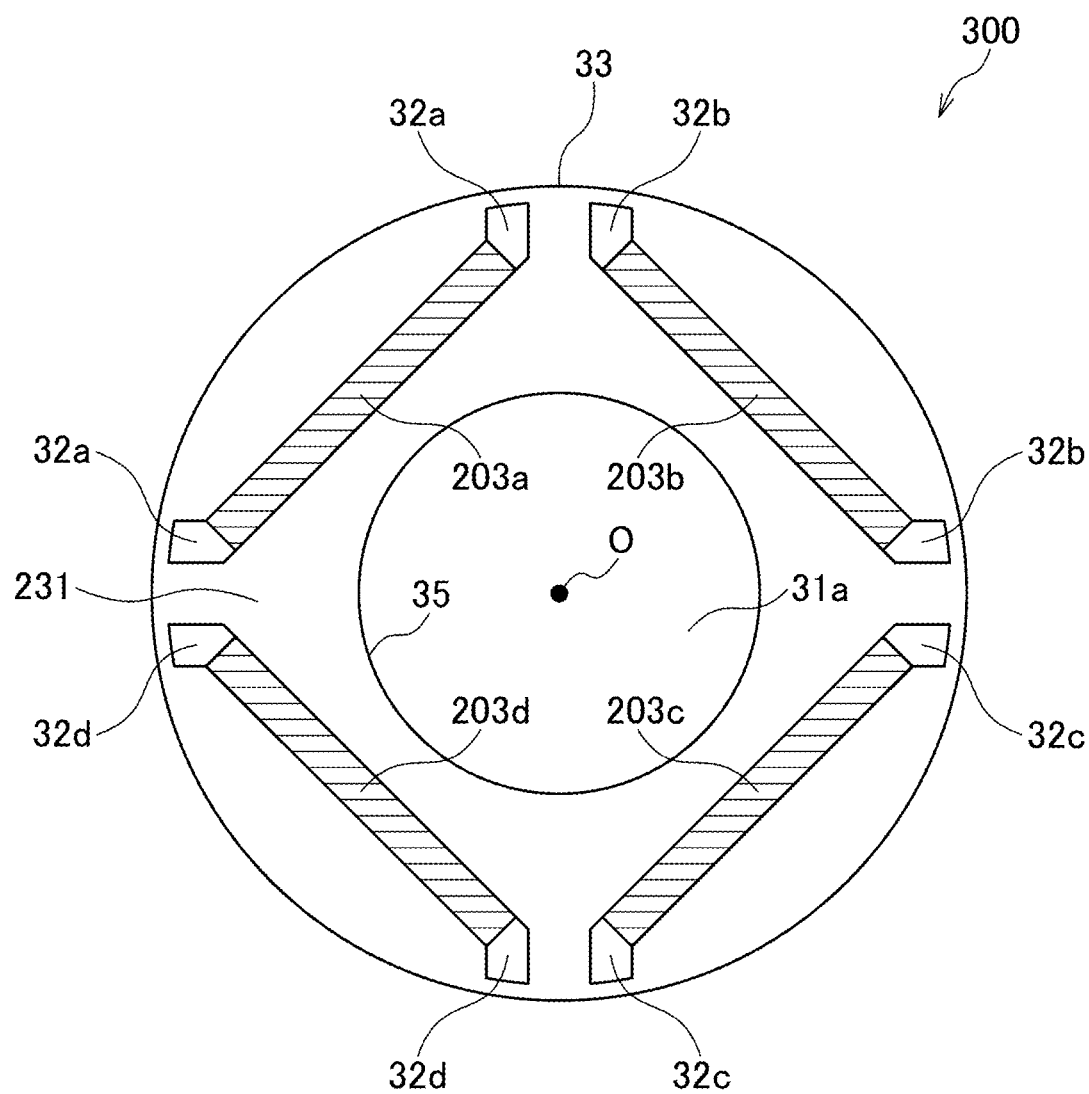
FIG. 2 is a horizontal cross-sectional view of a rotor of the synchronous motor used in the reference example.
Figure 3:
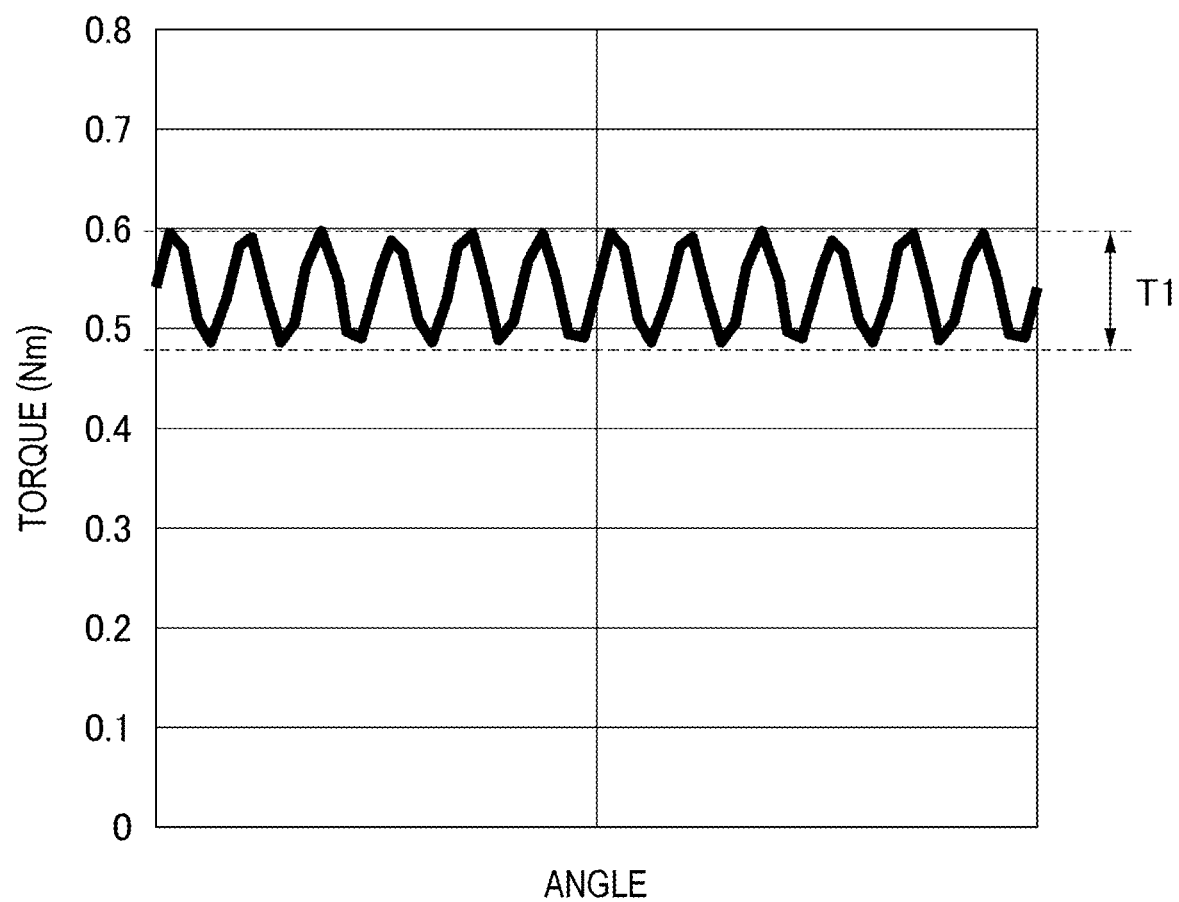
FIG. 3 is a diagram illustrating a torque waveform in the rotor of the synchronous motor used in the reference example.

In order to describe the details of a rotor 3 of a synchronous motor 100 according to the embodiment, the rotor 300 of the synchronous motor 10 used in the reference example is described as a comparison target with reference to FIGS. 2 and 3.

FIG. 2 is a horizontal cross-sectional view of the rotor 300 of the synchronous motor 10 used in the reference example. As illustrated in FIG. 2, an outer peripheral portion 33 and an inner peripheral portion 35 of the rotor core 231 has a circular shape centered around a rotation center O.

Each of the rotor magnets 203a to 203d is formed in a cylindrical column form. The rotor magnets 203a to 203d have substantially the same size, material, and composition. Moreover, the rotor magnets 203a to 203d are placed at regular intervals on a circumference centered around the rotation center O and along tangent lines of the circumference. Therefore, the magnetomotive forces for the stator coils resulting from the rotor magnets 203a to 203d are substantially equal. Moreover, cavity portions 32a to 32d extending outward in a direction of the radius of the rotor core 231 in cross section are each provided at two ends of a respective one of the rotor magnets 203a to 203d.

FIG. 3 a diagram illustrating a torque waveform in the rotor 300 of the synchronous motor 10 used in the reference example. The horizontal axis represents angle. The vertical axis represents torque. A reference numeral T1 illustrated in FIG. 3 represents the value of torque ripple of the torque waveform. Note that the synchronous motor 10 including the rotor 300 used to measure the torque waveform of FIG. 3 has a structure of a 10-pole 12-slot interior permanent magnet synchronous motor (IPMSM) with concentrated winding.

Generally, it is known that the sixth harmonic torque ripple component is generated in a motor. The sixth harmonic ripple component can become a cause of the deterioration of motor controllability, vibration, or noise.

Main causes of the generation of torque ripple are the following flux density harmonic components (1) to (4):

(1) Rotating magnetic field harmonics that are harmonics superimposed on the rotating magnetic field of an armature;
(2) Field magnetomotive force harmonics that are magnetomotive force harmonics generated by, for example, magnetomotive force (shape or layout) of the rotor magnets;
(3) Phase belt harmonics that are harmonics resulting from the layout of armature winding; and
(4) Slot harmonics that are harmonics due to air-gap permeance variations resulting from armature winding slots.

Of them, (1) to (3) are known to appear mainly as the fifth or seventh harmonic component of the air-gap flux density. Moreover, the sixth harmonic torque ripple component is known to result from the fifth or seventh harmonic component of the air-gap flux density.

It was studied to decrease the sixth harmonic ripple component by providing the outer peripheral portion of the rotor with 6N (N is a natural number) groove portions per pole pair and by providing 6N permeance variations by use of the groove portions. The 6N permeance variations change the amplitudes and phases of the fifth or seventh harmonic of and a harmonic of a multiple of order 5 or 7 of the air-gap flux density, which are causes of the sixth harmonic torque ripple component. The amplitudes of these harmonic components are reduced to enable a reduction in torque ripple pulsation. Moreover, the phases of these harmonic components are made opposite so that it is possible to change the phase of the torque ripple.

First Embodiment

The rotor 3 of the synchronous motor 100 according to a first embodiment is described in detail below with reference to FIGS. 4 to 6.

Figure 4:
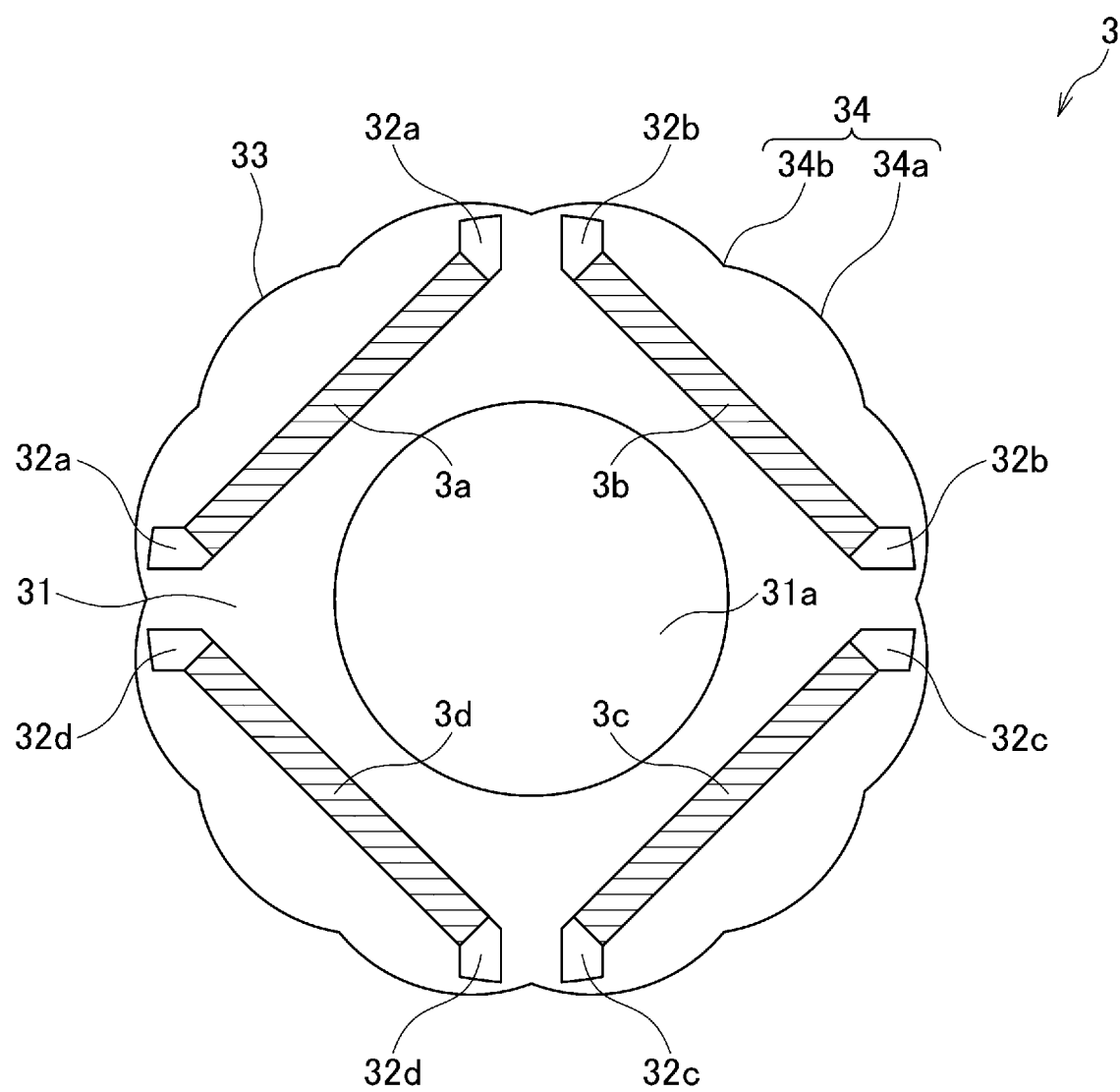
FIG. 4 is a horizontal cross-sectional view of a rotor of a synchronous motor according to a first embodiment.
Figure 5:
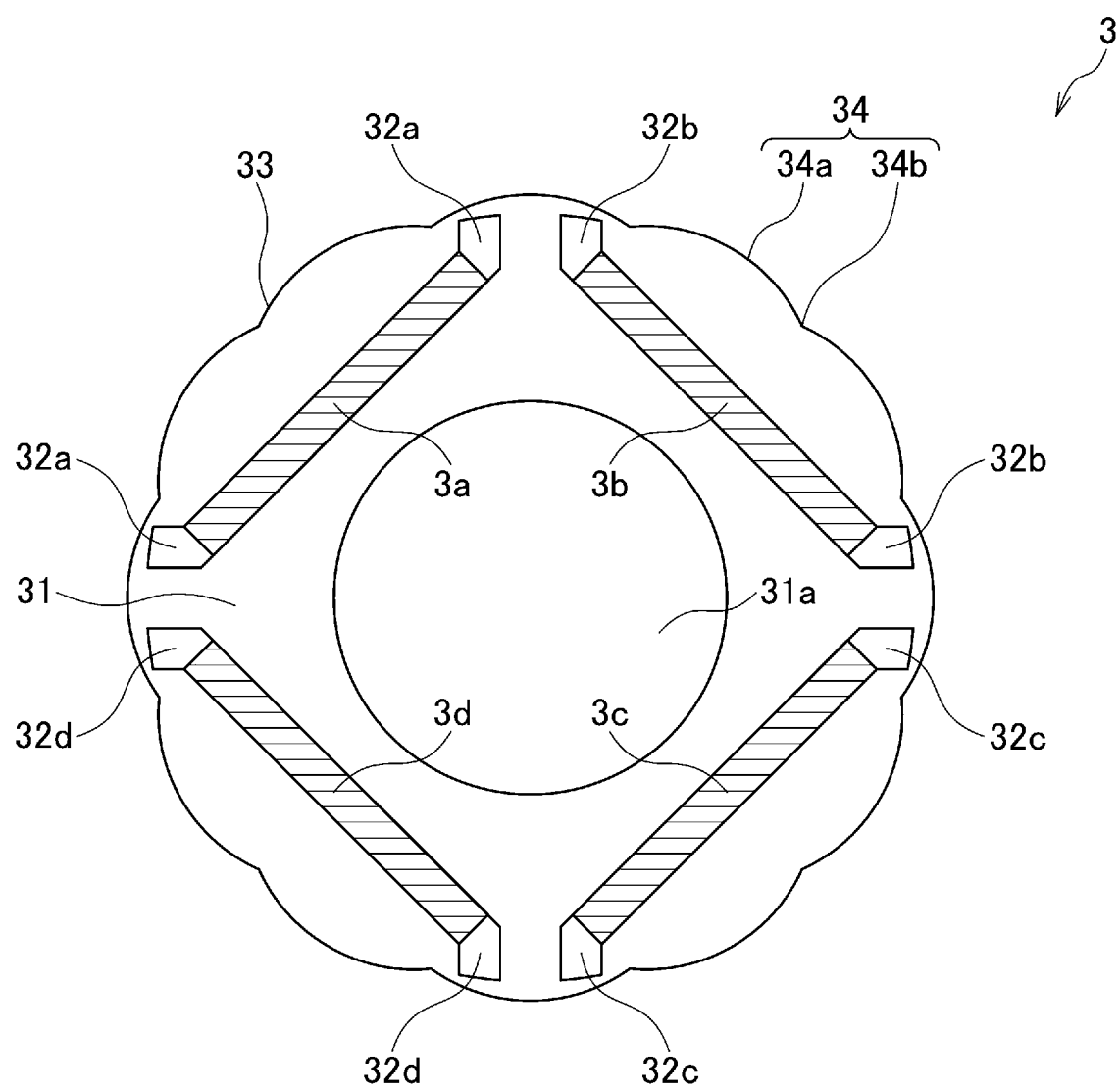
FIG. 5 is a horizontal cross-sectional view of a rotor of a synchronous motor according to a modification of the first embodiment.

FIG. 4 is a horizontal cross-sectional view of the rotor 3 of the synchronous motor 100 according to the first embodiment.

As illustrated in FIG. 4, a rotor core 31 is different from the rotor core 231 of the synchronous motor used in the reference example, the rotor core 231 being illustrated in FIG. 2. In other words, the rotor core 31 includes a plurality of first groove portions 34 on an outer peripheral portion 33. Each of the plurality of first groove portions 34 includes an arc-shaped protrusion portion 34a and a depression portion 34b. Note that the shape of the protrusion portions 34a is not limited to the arc shape. The protrusion portions 34a may have a saw shape or a trapezoidal shape.

In the configuration illustrated by example in FIG. 4, the depression portion 34b is placed between two adjacent cavity portions of cavity portions 32a to 32d. As illustrated in FIG. 5, the protrusion portion 34a may be placed between two adjacent cavity portions as a modification of the first embodiment.

Let the number of the plurality of first groove portions 34 be C1, let the number of pole pairs of the rotor magnets 3a to 3d be P, and let any natural number be N. The rotor 3 is configured in such a manner as to satisfy $C1=P\times 6N$. In the exemplification of FIG. 4, the number P of pole pairs of the rotor magnets 3a to 3d is 2, and the number C1 of the plurality of first groove portions is 12. Hence, the above equation is satisfied. When the number P of pole pairs of the rotor magnets 3a to 3d is 2, the number C1 of the plurality of first groove portions is simply required to be a multiple of 12 on the basis of the above equation. With the above configuration, the flux density waveform in the rotor changes. Hence, the harmonic components of the flux density waveform can be reduced.

Figure 6:
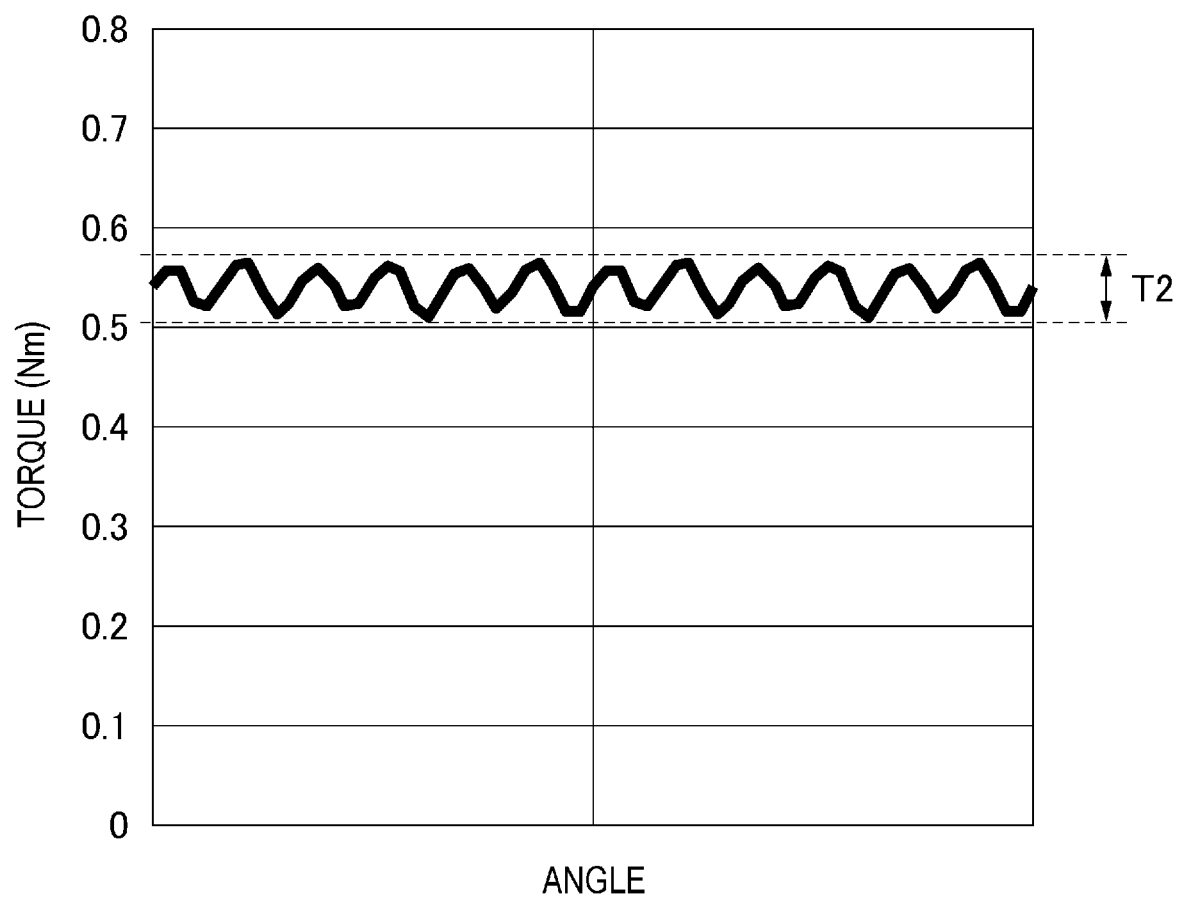
FIG. 6 is a diagram illustrating a torque waveform in the rotor of the synchronous motor according to the first embodiment.

FIG. 6 is a diagram illustrating a torque waveform in the rotor 3 of the synchronous motor 100 according to the first embodiment. The horizontal axis represents angle. The vertical axis represents torque. Note that the synchronous motor 100 including the rotor 3 used to measure the torque waveform of FIG. 6 has a structure of a 10-pole 12-slot interior permanent magnet synchronous motor (IPMSM) with concentrated winding.

As illustrated in FIG. 6, torque ripple T2 in the rotor 3 of the synchronous motor 100 according to the first embodiment is reduced to or below ½ of the torque ripple T1 of the rotor 300 of the synchronous motor 10 used in the reference example, the rotor 300 being illustrated in FIG. 3. In other words, the torque ripple is reduced by providing the outer peripheral portion 33 of the rotor 3 with 6N groove portions per pole pair and by providing 6N permeance variations by use of these groove portions. Therefore, for example, vibration or noise is reduced. Accordingly, the performance of the motor can be improved.

Second Embodiment

A rotor 3' of a synchronous motor 100 according to a second embodiment is described in detail below with reference to FIGS. 7 to 10.

Figure 7:
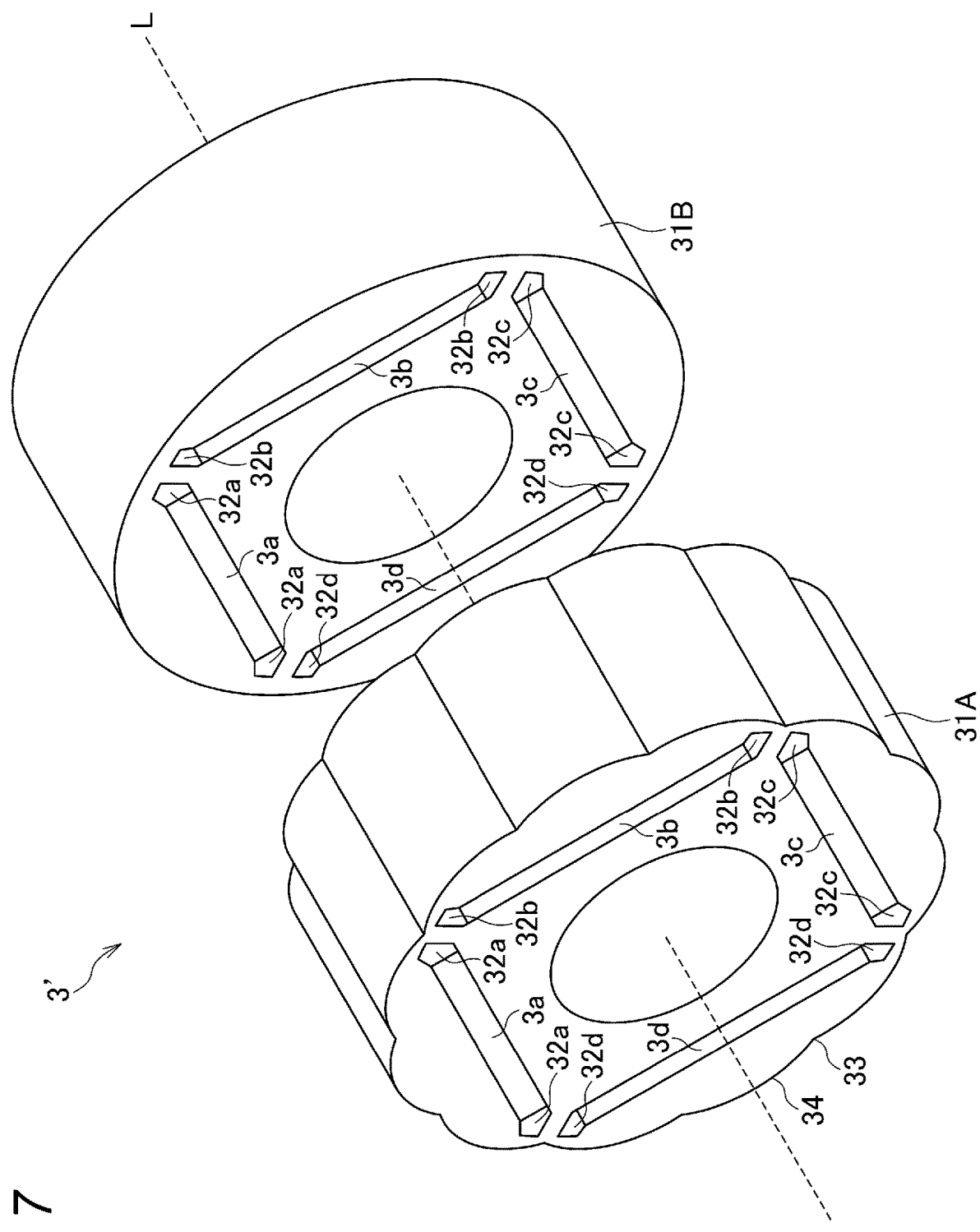
FIG. 7 is a schematic diagram of a rotor of a synchronous motor according to a second embodiment.

FIG. 7 is a schematic diagram of the rotor 3' of the synchronous motor 100 according to the second embodiment. The configuration of the rotor 3' is a combination of the configuration of the rotor 300 of the synchronous motor 10 used in the reference example and the configuration of the rotor 3 of the synchronous motor 100 according to the first embodiment.

A rotor core of the rotor 3' has a configuration including a plurality of first core sheets 31A and 31B laminated in a rotation axis direction L. As the first core sheets 31A and 31B adjacent in the axial direction are perspectively viewed in the axial direction, the outer peripheral portion 33 of at least one of the first core sheets (the first core sheet 31A in the exemplification of FIG. 7) is provided with the plurality of first groove portions 34.

Let the number of the plurality of first groove portions 34 be C1, let the number of pole pairs of the rotor magnets 3a to 3d be P, and let any natural number be N. The rotor 3' is configured in such a manner that an area including the first core sheet 31A satisfies C1=P×6N. In the exemplification of FIG. 7, the number P of pole pairs of the rotor magnets 3a to 3d is 2, and the number C1 of the plurality of first groove portions is 12. Hence, the above equation is satisfied. If the number P of pole pairs of the rotor magnets 3a to 3d is two, the number C1 of the plurality of first groove portions is simply required to be a multiple of 12 on the basis of the above equation. With the above configuration, the phase of a flux density waveform in the area including the first core sheet 31A changes.

Figure 8:
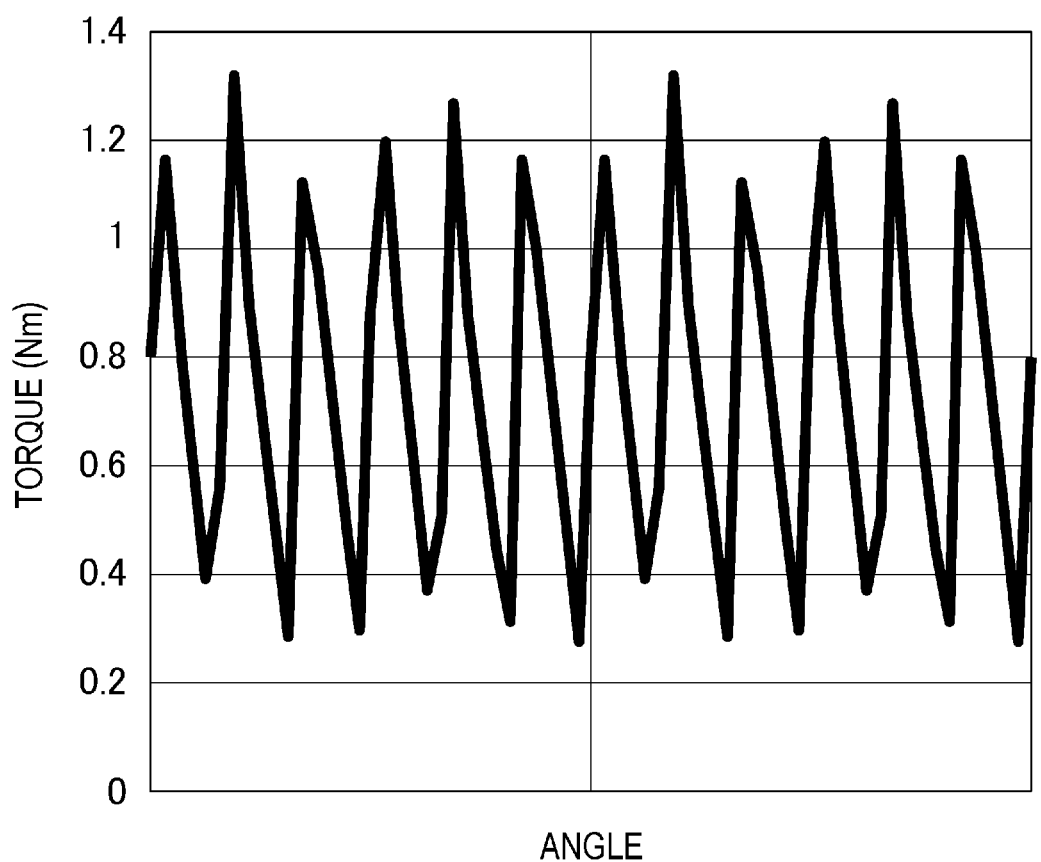
FIG. 8 is a diagram illustrating a torque waveform in an area including a first core sheet of the rotor illustrated in FIG. 7.
Figure 9:
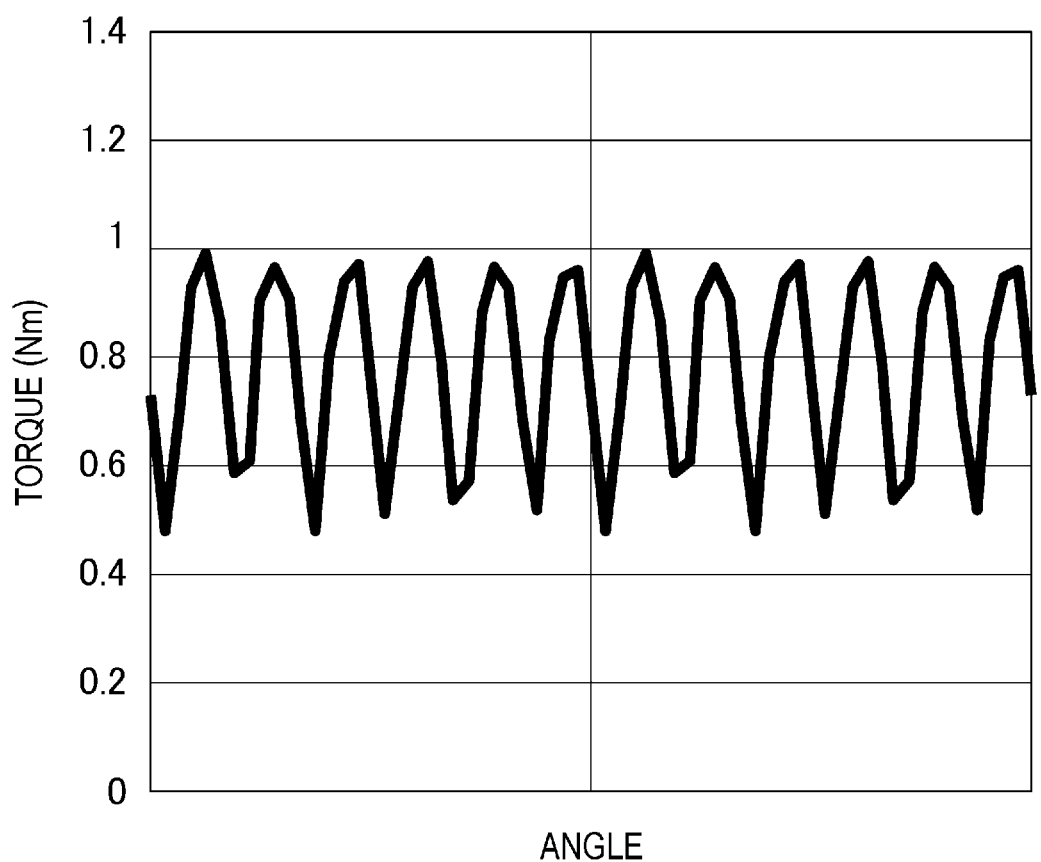
FIG. 9 is a diagram illustrating a torque waveform in an area including a first core sheet of the rotor illustrated in FIG. 7.

FIG. 8 is a diagram illustrating a torque waveform in the area including the first core sheet 31A of the rotor 3' illustrated in FIG. 7. FIG. 9 is a diagram illustrating a torque waveform in an area including the first core sheet 31B of the rotor 3' illustrated in FIG. 7. In FIGS. 8 and 9, the horizontal axis represents angle. Moreover, the vertical axis represents torque.

When FIGS. 8 and 9 are compared, the phase of the torque waveform in the area including the first core sheet 31A, and the phase of the torque waveform in the area including the first core sheet 31B are opposite to each other. This is because the phase of the flux density waveform has changed in the area including the first core sheet 31A by providing the outer peripheral portion 33 of the rotor 3' with 6N first groove portions 34 per pole pair and by providing 6N permeance variations by use of the first groove portions 34.

Figure 10:
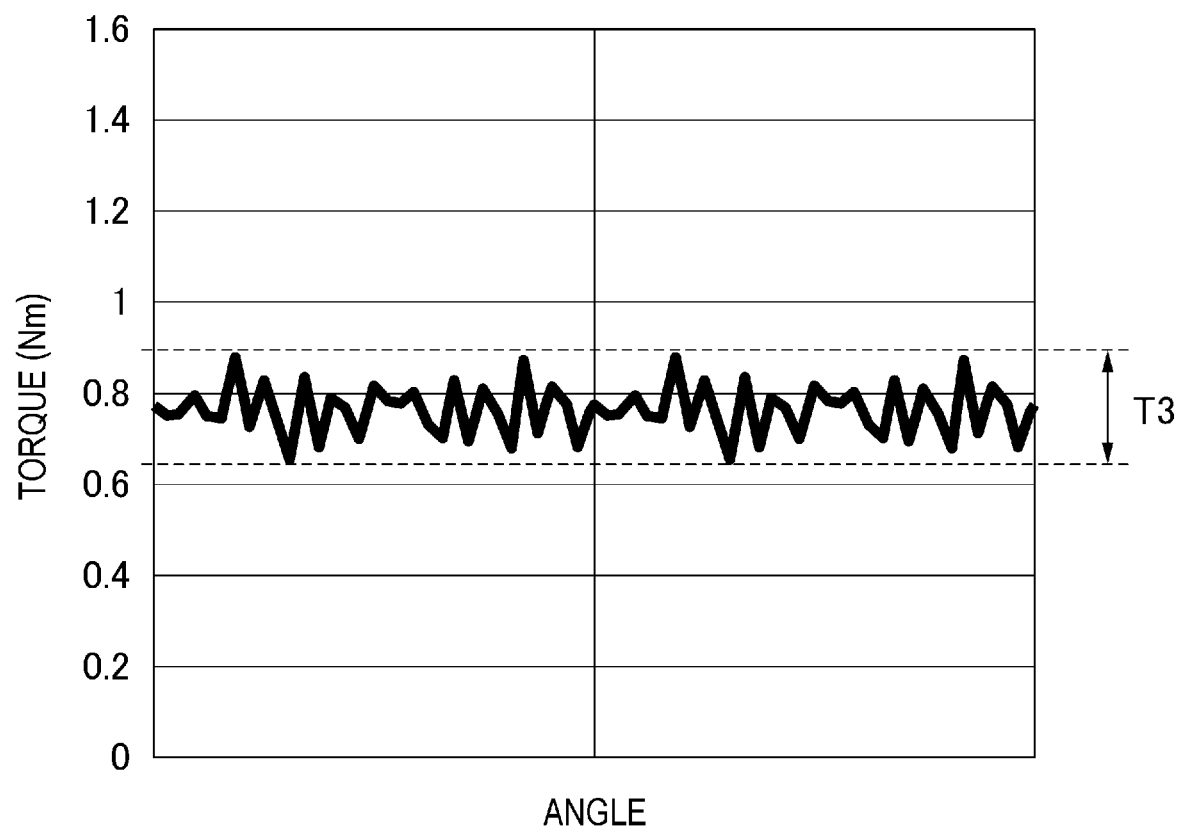
FIG. 10 is a diagram illustrating a composite torque waveform in the synchronous motor including the rotor according to the second embodiment.

FIG. 10 is a diagram illustrating a torque waveform in the entire synchronous motor including the rotor 3' according to the second embodiment, the rotor 3' being illustrated in FIG. 7. The horizontal axis represents angle. The vertical axis represents torque. The torque waveform illustrated in FIG. 10 is a composite waveform of the torque waveform illustrated in FIG. 8 and the torque waveform illustrated in FIG. 9. Note that the synchronous motor including the rotor 3' used to measure the torque waveform of FIG. 10 has a structure of a 4-pole 24-slot IPMSM with distributed winding.

The phase of the torque waveform illustrated in FIG. 8 and the phase of the torque waveform illustrated in FIG. 9 are opposite to each other. Hence, the two torques are combined as the torque of the entire synchronous motor. Consequently, the ripple is cancelled out. As a result, the harmonic components of torque ripple T3 are reduced. Therefore, for example, vibration or noise is reduced. Accordingly, the performance of the motor can be improved.

Third Embodiment

A rotor 3" of a synchronous motor 100 according to a third embodiment is described in detail below with reference to FIGS. 11 to 14.

Figure 11:
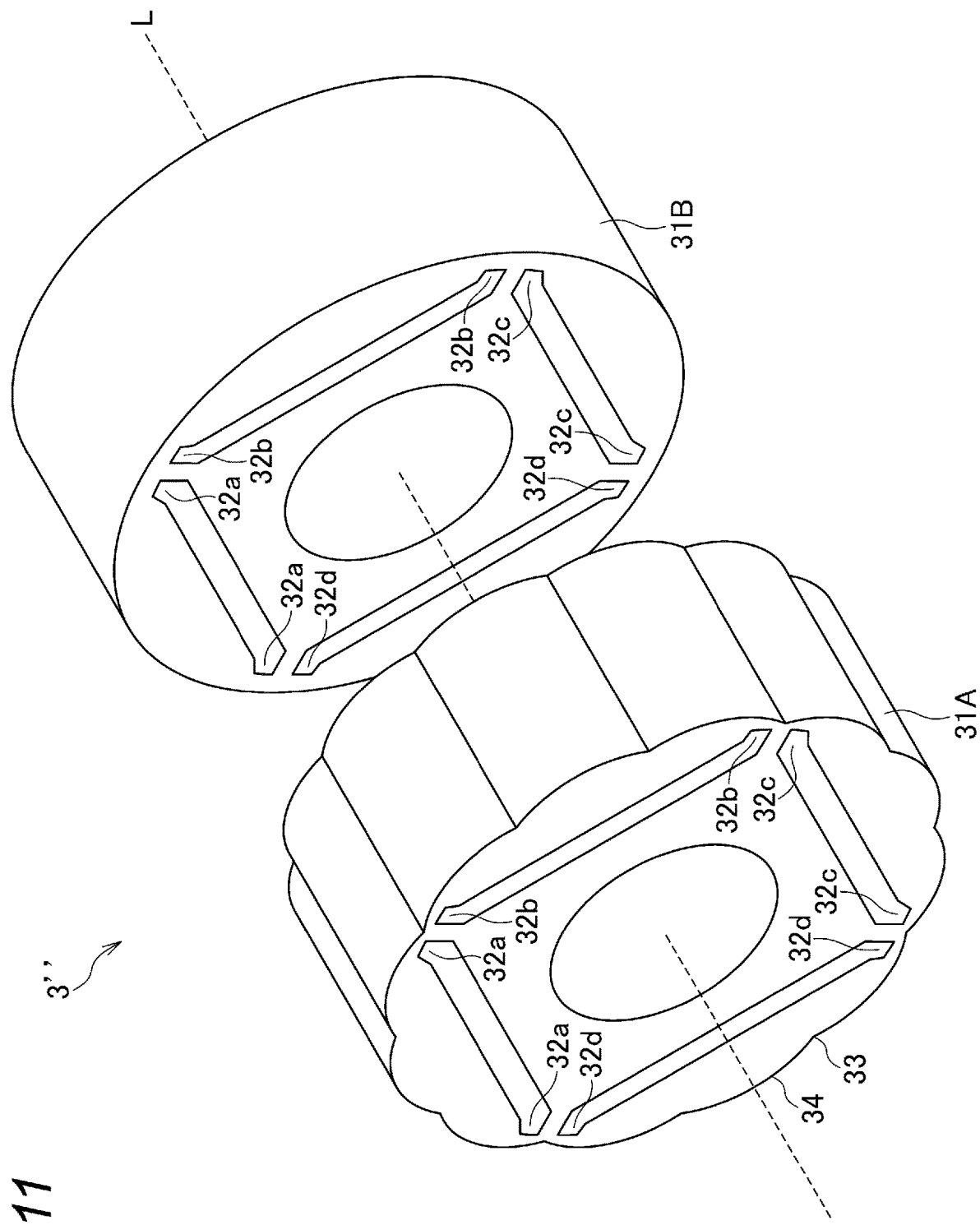
FIG. 11 is a schematic diagram of a rotor of a synchronous motor according to a third embodiment.

FIG. 11 is a schematic diagram of the rotor 3" of the synchronous motor 100 according to the third embodiment. The rotor 3" has a configuration excluding the rotor magnets 3a to 3d from the rotor 3' of the synchronous motor 100 according to the second embodiment. The spaces where there were the rotor magnets 3a to 3d are filled with air.

A rotor core of the rotor 3" has a configuration including the plurality of first core sheets 31A and 31B laminated in the rotation axis direction L as in the second embodiment. As the first core sheets 31A and 31B adjacent in the axial direction are perspectively viewed in the axial direction, the outer peripheral portion 33 of at least one of the first core sheets (the first core sheet 31A in the exemplification of FIG. 11) is provided with the plurality of first groove portions 34.

Figure 12:
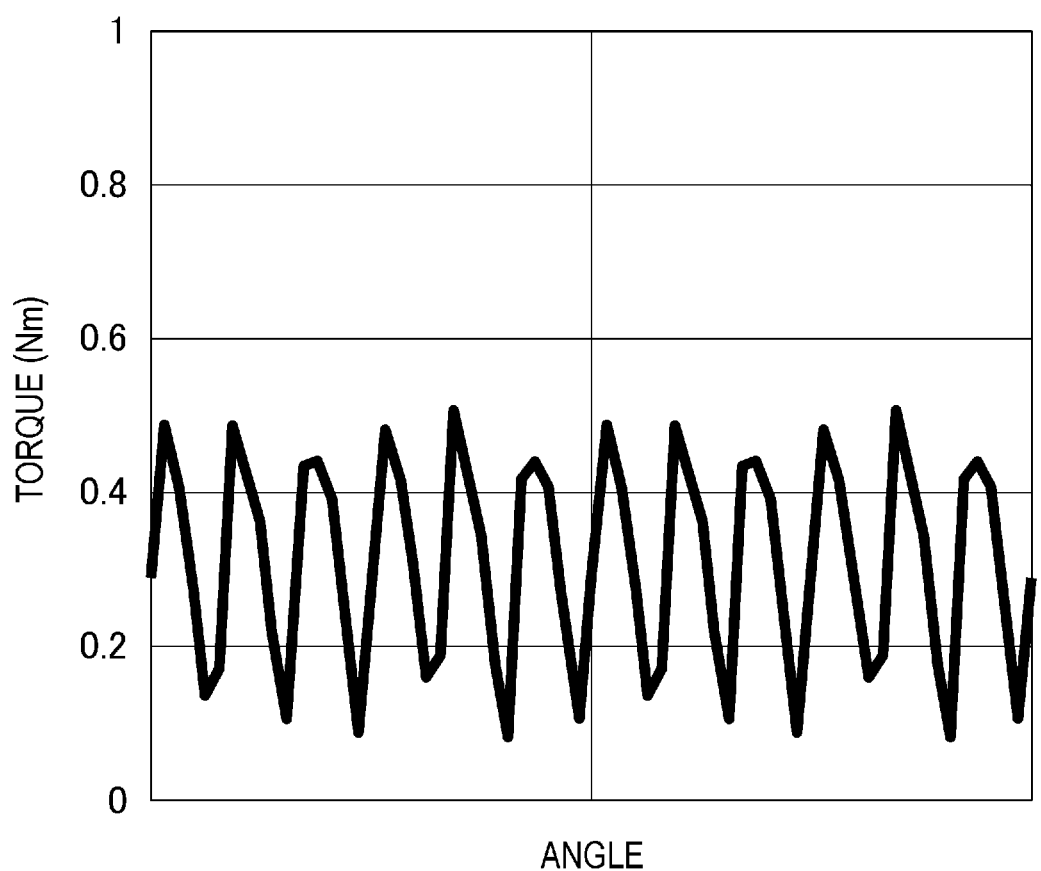
FIG. 12 is a diagram illustrating a torque waveform in an area including a first core sheet of the rotor illustrated in FIG. 11.
Figure 13:
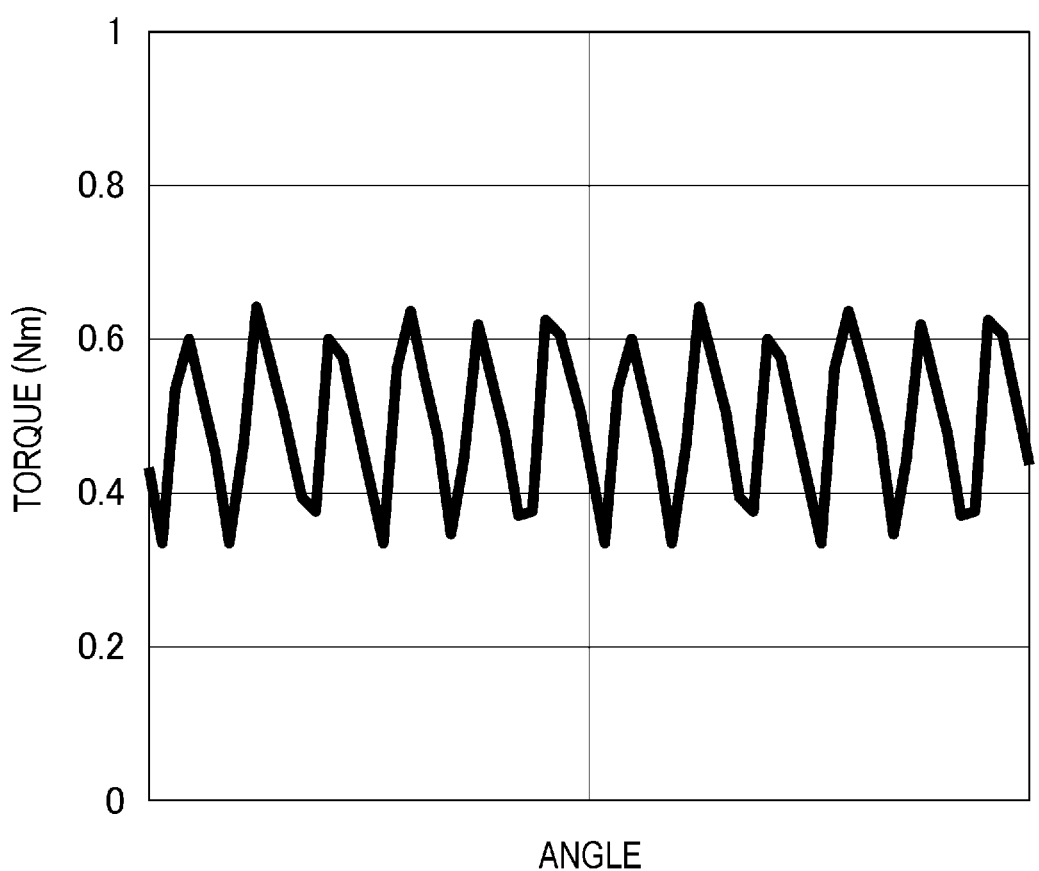
FIG. 13 is a diagram illustrating a torque waveform in an area including a first core sheet of the rotor illustrated in FIG. 11.

FIG. 12 is a diagram illustrating a torque waveform in an area including the first core sheet 31A of the rotor 3" illustrated in FIG. 11. FIG. 13 is a diagram illustrating a torque waveform in an area including the first core sheet 31B of the rotor 3" illustrated in FIG. 11. In FIGS. 12 and 13, the horizontal axis represents angle. The vertical axis represents torque.

When FIGS. 12 and 13 are compared, the phase of the torque waveform in the area including the first core sheet 31A, and the phase of the torque waveform in the area including the first core sheet 31B are opposite to each other as in the second embodiment. This is because the phase of the flux density waveform has changed in the area including the first core sheet 31A by providing the outer peripheral portion 33 of the rotor 3" with 6N first groove portions 34 per pole pair and by providing 6N permeance variations by use of the first groove portions 34.

Figure 14:
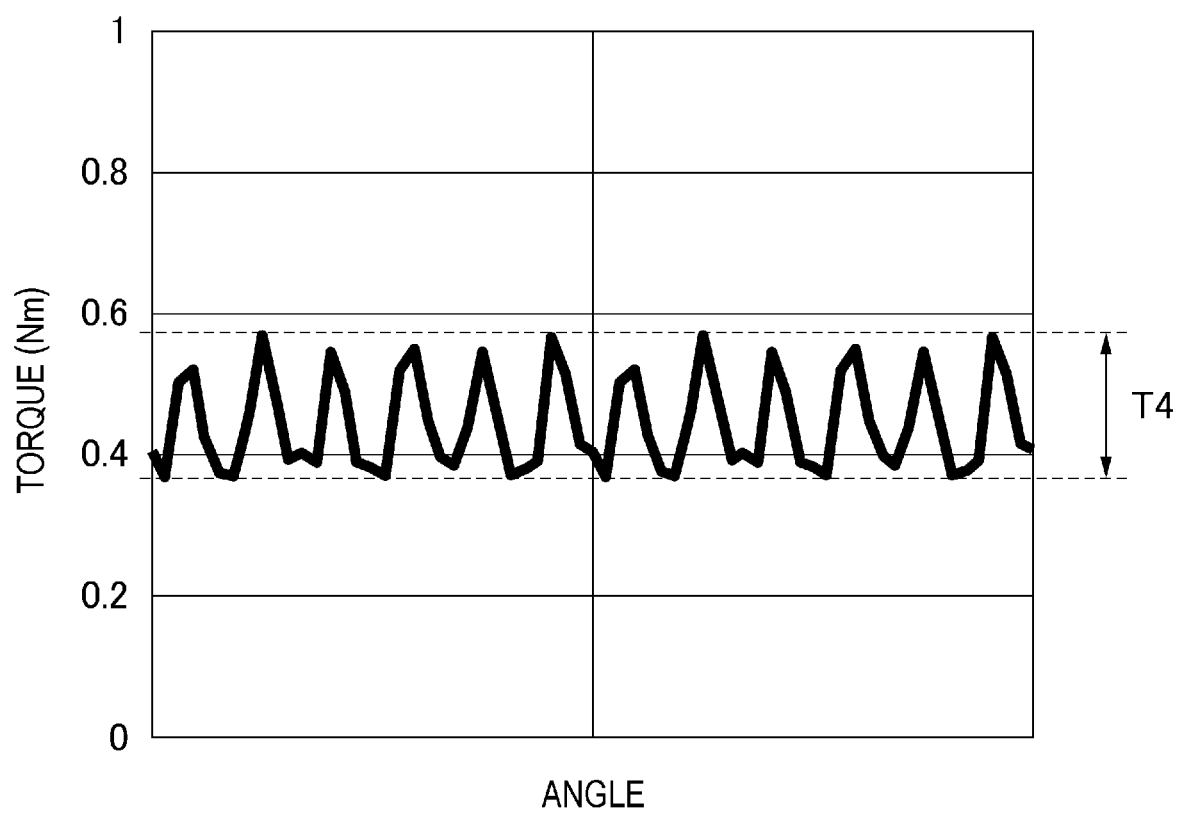
FIG. 14 is a diagram illustrating a composite torque waveform in the synchronous motor including the rotor according to the third embodiment.

FIG. 14 is a diagram illustrating a torque waveform in the entire synchronous motor including the rotor 3" according to the third embodiment, the rotor 3" being illustrated in FIG. 11. The horizontal axis represents angle. The vertical axis represents torque. The torque waveform illustrated in FIG. 14 is a composite waveform of the torque waveform illustrated in FIG. 12 and the torque waveform illustrated in FIG. 13. Note that the synchronous motor including the rotor 3'" used to measure the torque waveform of FIG. 14 is a 4-pole 24-slot synchronous reluctance motor (Synchronous Reluctance Motor: SynRM) with distributed winding.

The phase of the torque waveform illustrated in FIG. 12 and the phase of the torque waveform illustrated in FIG. 13 are opposite to each other. Hence, the two torques are combined as the torque of the entire synchronous motor. Consequently, the ripple is cancelled out. As a result, the harmonic components of the torque ripple T3 are reduced. Therefore, the ripple can be decreased even in the configuration excluding the rotor magnets from the rotor of the synchronous motor, that is, reluctance torque as in the embodiment. Hence, for example, vibration or noise is reduced. Accordingly, the performance of the motor can be improved.

Fourth Embodiment

A synchronous motor 100' according to a fourth embodiment is described in detail below with reference to FIGS. 15 to 18.

Figure 15:
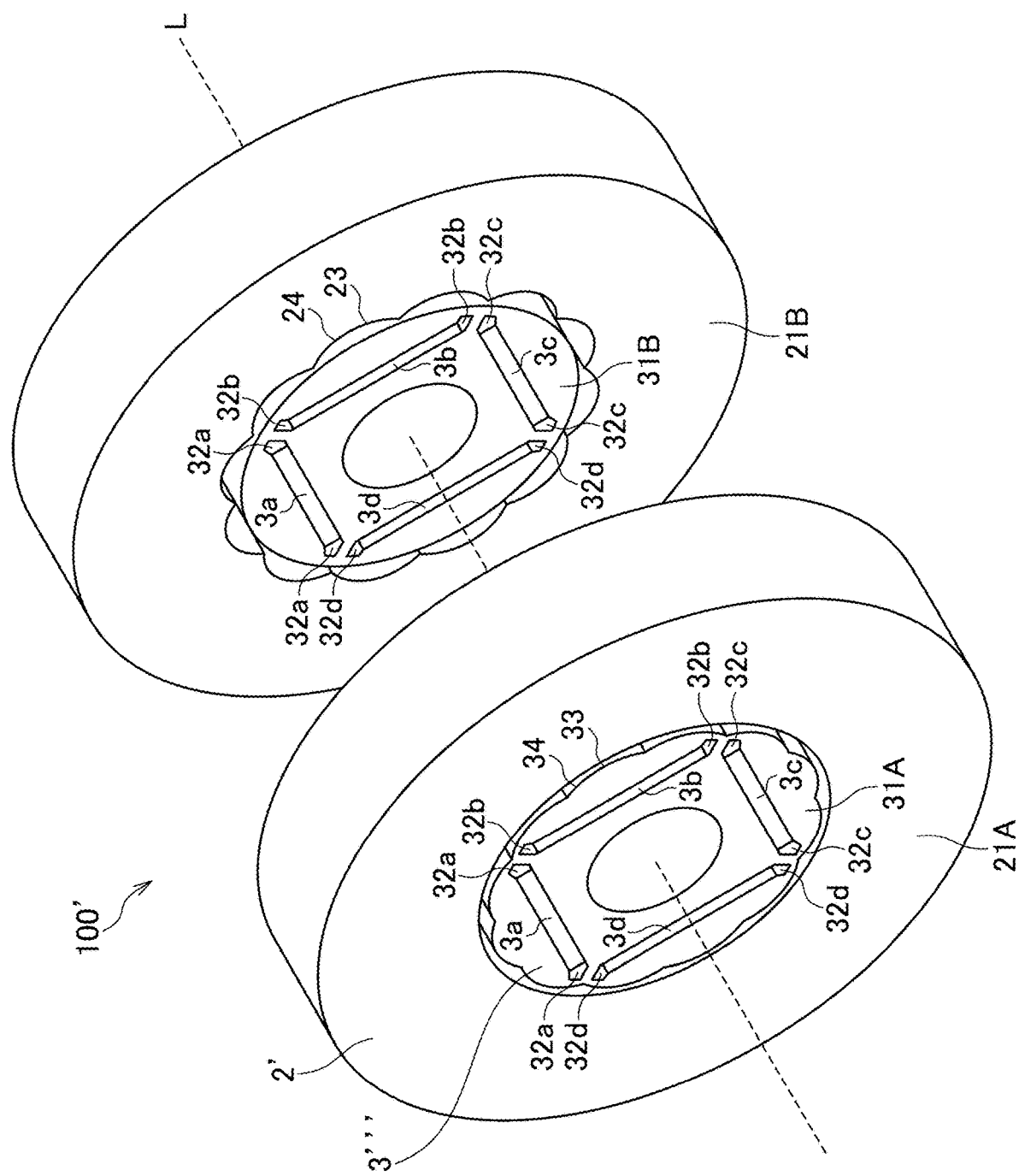
FIG. 15 is a schematic diagram of a synchronous motor according to a fourth embodiment.

FIG. 15 is a schematic diagram of the synchronous motor 100' according to the fourth embodiment. The synchronous motor 100' according to the fourth embodiment includes a rotor 3'" and a stator 2'.

In a rotor core of the rotor 3'", the plurality of first core sheets 31A and 31B is laminated in the rotation axis direction L. As the first core sheets 31A and 31B adjacent in the rotation axis direction are perspectively viewed in the rotation axis direction, the outer peripheral portion 33 of one of the first core sheets (the first core sheet 31A in the exemplification of FIG. 15) is provided with the plurality of first groove portions 34. Let the number of the plurality of first groove portions 34 be C1, let the number of pole pairs of the rotor magnets 3a to 3d be P, and let any natural number be N1. The first core sheet is configured in such a manner as to satisfy C1=P×6N1.

Moreover, in a stator core of the stator 2', a plurality of second core sheets 21A and 21B is laminated in the rotation axis direction L. As the second core sheets 21A and 21B adjacent in the axial direction are perspectively viewed in the axial direction, an inner peripheral portion 23 of one of the second core sheets (the second core sheet 21B in the exemplification of FIG. 15) is provided with a plurality of second groove portions 24. The second groove portion 24 includes a protrusion portion and a depression portion as in the first groove portion 34. Therefore, the inner diameter of the second core sheet has a shape that is partially recessed. Let the number of the plurality of second groove portions 24 be C2, let the number of pole pairs of the rotor magnets 3a to 3d be P, and let any of natural numbers be N2. The second core sheet is configured in such a manner as to satisfy C2=P×6N2.

Figure 16:
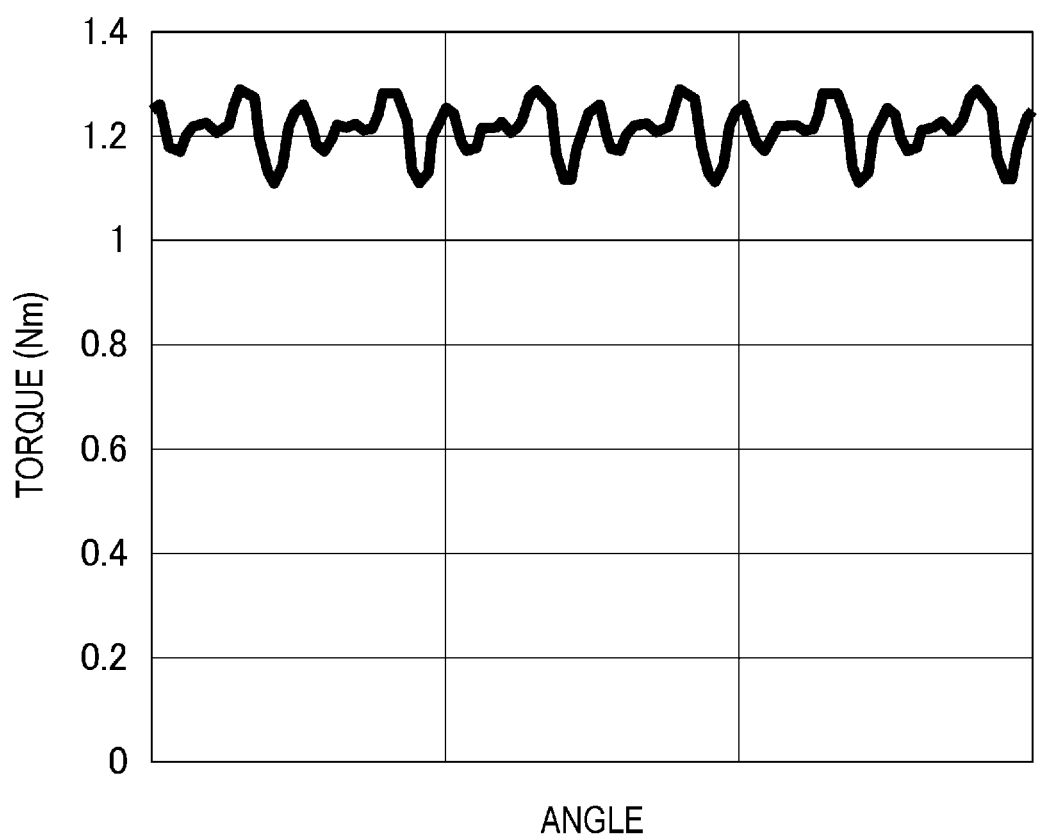
FIG. 16 is a diagram illustrating a torque waveform in an area including a first core sheet of the synchronous motor illustrated in FIG. 15.
Figure 17:
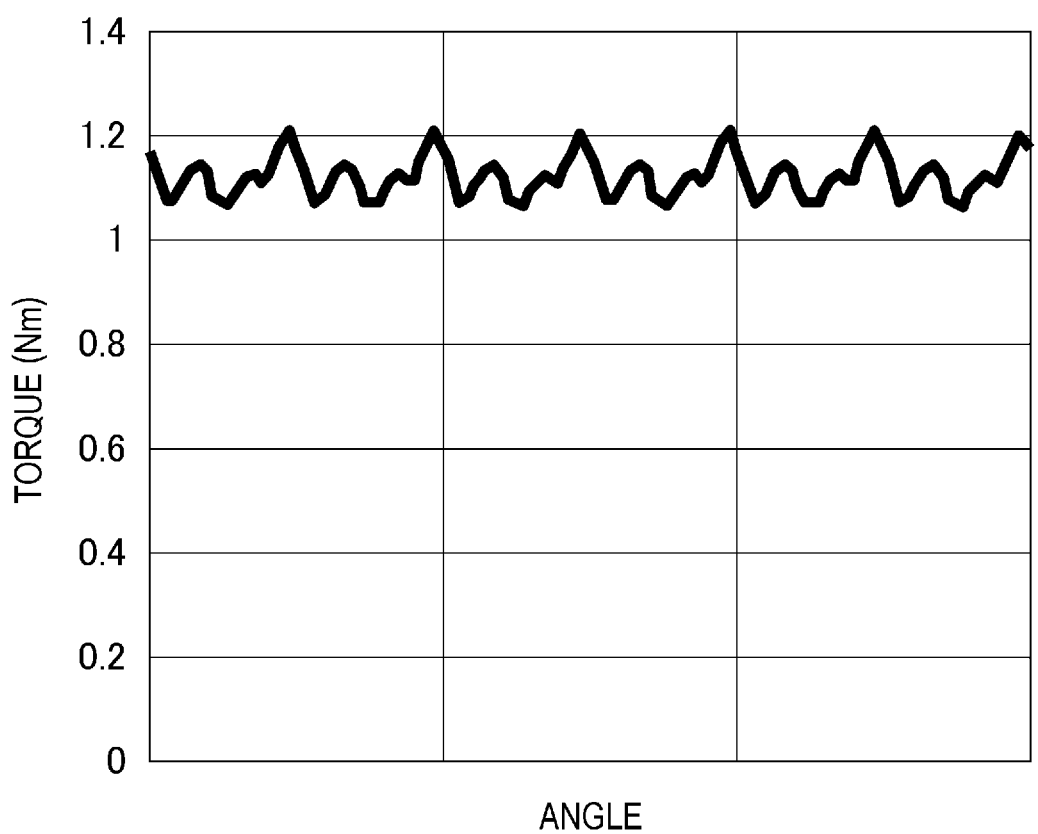
FIG. 17 is a diagram illustrating a torque waveform in an area including a second core sheet of the synchronous motor illustrated in FIG. 15.

FIG. 16 is a diagram illustrating a torque waveform in an area including the first core sheet 31A of the synchronous motor 100' illustrated in FIG. 15. FIG. 17 is a diagram illustrating a torque waveform in an area including the second core sheet 21B of the synchronous motor 100' illustrated in FIG. 15. In FIGS. 16 and 17, the horizontal axis represents angle. The vertical axis represents torque.

When FIGS. 16 and 17 are compared, the phase of the torque waveform in the area including the first core sheet 31A, and the phase of the torque waveform in the area including the second core sheet 21B are opposite to each other.

Figure 18:
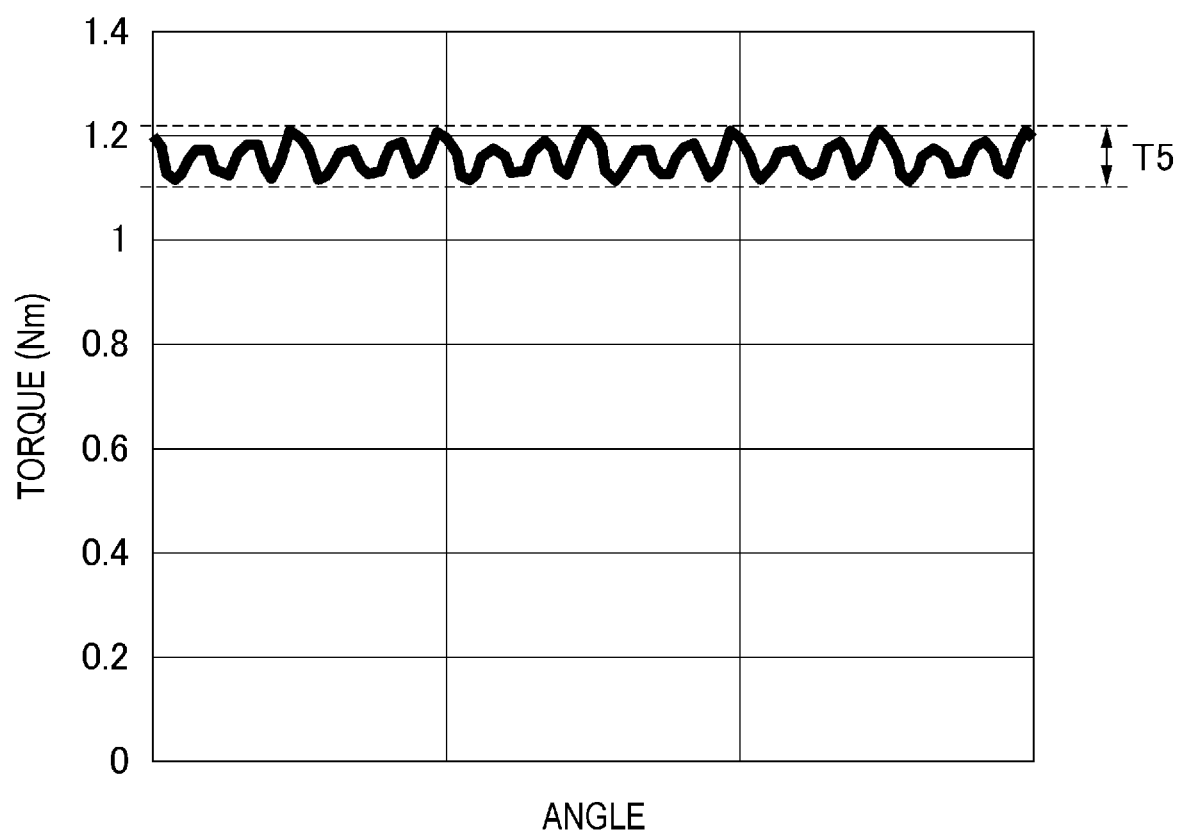
FIG. 18 is a diagram illustrating a composite torque waveform in the synchronous motor according to the fourth embodiment.

FIG. 18 is a diagram illustrating torque ripple T5 in the entire synchronous motor 100' according to the fourth embodiment illustrated in FIG. 15. The horizontal axis represents angle. The vertical axis represents torque. The torque waveform illustrated in FIG. 18 is a composite waveform of the torque waveform illustrated in FIG. 16 and the torque waveform illustrated in FIG. 17.

The phase of the torque waveform illustrated in FIG. 16 and the phase of the torque waveform illustrated in FIG. 17 are opposite to each other as in the second and third embodiments. Hence, the two torques are combined as the torque of the entire synchronous motor. Consequently, the ripple is cancelled out. As a result, the harmonic components of the torque ripple T5 are reduced. Therefore, for example, vibration or noise is reduced. Accordingly, the performance of the motor can be improved.

Up to this point the embodiments of the present disclosure have been described. However, it needless to say that the technical scope of the embodiments should not be construed in a limited manner by the above-mentioned detailed description. The above-mentioned embodiments are mere examples. Those skilled in the art understand that the embodiments can be modified in various manners within the scope of the disclosure described in the claims. The technical scope of the embodiments should be determined on the basis of the scope of the disclosure described in the claims and the scope of equivalents thereof.

In the above-mentioned embodiments, the rotor used in the synchronous motor is described. However, the rotor according to the embodiments can also be applied to a synchronous generator.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A rotor of a synchronous motor, comprising:
a plurality of poles; and
a plurality of first groove portions located on an outer peripheral portion of the rotor, wherein
each of the plurality of first groove portions includes an arc-shaped protrusion and a depression portion, and
a relationship of C1=P×6N is satisfied, where C1 is a number of the plurality of first groove portions, P is a number of pole pairs of the plurality of poles, and N is any natural number.

2. The rotor according to claim 1, further comprising a plurality of first core sheets laminated in a rotation axis direction, wherein
as the first core sheets adjacent in the rotation axis direction are perspectively viewed in the rotation axis direction, the plurality of first groove portions is provided to an outer peripheral portion of at least one of the first core sheets.

3. A motor or generator comprising:
the rotor according to claim 1; and
a stator.

4. A motor or generator comprising:
the rotor according to claim 2; and
a stator.

5. The motor or generator according to claim 3, wherein
the rotor includes a plurality of first core sheets laminated in a rotation axis direction,
the stator includes a plurality of second core sheets laminated in the rotation axis direction,
as the first core sheets and the second core sheets, which are adjacent in the rotation axis direction, are perspectively viewed in the rotation axis direction, the plurality of first groove portions is provided to an outer peripheral portion of one of the first core sheets, and a plurality of second groove portions is provided to an inner peripheral portion of the second core sheet corresponding to another of the first core sheets, and
a relationship of $C2=P \times 6N$ is satisfied in the second core sheet including the plurality of second groove portions, where C2 is a number of the plurality of second groove portions, P is a number of pole pairs of the plurality of poles, and N is any natural number.

6. The motor or generator according to claim 4, wherein
the stator includes a plurality of second core sheets laminated in the rotation axis direction,
as the first core sheets and the second core sheets, which are adjacent in the rotation axis direction, are perspectively viewed in the rotation axis direction, the plurality of first groove portions is provided to an outer peripheral portion of one of the first core sheets, and a plurality of second groove portions is provided to an inner peripheral portion of the second core sheet corresponding to another of the first core sheets, and
a relationship of $C2=P \times 6N$ is satisfied in the second core sheet including the plurality of second groove portions, where C2 is a number of the plurality of second groove portions, P is a number of pole pairs of the plurality of poles, and N is any natural number.

7. The rotor according to claim 1, wherein the plurality of first groove portions are arranged in a circumferential direction of the rotor at a regular interval.

* * * * *